(12) United States Patent
Weiner

(10) Patent No.: US 10,508,598 B2
(45) Date of Patent: Dec. 17, 2019

(54) COOLING SYSTEMS FOR GAS TURBINE ENGINES

(71) Applicant: United Technologies Corporation, Farmington, CT (US)

(72) Inventor: Richard Alan Weiner, Farmington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 452 days.

(21) Appl. No.: 15/111,997

(22) PCT Filed: Dec. 22, 2014

(86) PCT No.: PCT/US2014/071832
§ 371 (c)(1),
(2) Date: Jul. 15, 2016

(87) PCT Pub. No.: WO2015/108674
PCT Pub. Date: Jul. 23, 2015

(65) Prior Publication Data
US 2016/0333783 A1 Nov. 17, 2016

Related U.S. Application Data

(60) Provisional application No. 61/927,766, filed on Jan. 15, 2014.

(51) Int. Cl.
*F02C 7/14* (2006.01)
*F02C 7/06* (2006.01)
(Continued)

(52) U.S. Cl.
CPC .................. *F02C 7/14* (2013.01); *F02C 3/04* (2013.01); *F02C 7/06* (2013.01); *F02C 7/18* (2013.01);
(Continued)

(58) Field of Classification Search
CPC ...... F02C 7/14; F02C 3/04; F02C 7/06; F02C 7/18
See application file for complete search history.

(56) References Cited

U.S. PATENT DOCUMENTS 2,752,111 A * 6/1956 Schairer .................. F02C 7/047
244/57
3,528,250 A * 9/1970 Johnson .................. F02C 7/185
60/262

(Continued)

FOREIGN PATENT DOCUMENTS

EP 0514119 A1 11/1992
EP 1630358 A2 3/2006
(Continued)

OTHER PUBLICATIONS

European Search Report for Application No. EP 14 87 8605.
(Continued)

*Primary Examiner* — Michael A Riegelman
(74) *Attorney, Agent, or Firm* — Cantor Colburn LLP

(57) ABSTRACT

An air-oil cooler for a gas turbine engine includes an air cooling structure and a lubricant channel. The lubricant channel extends between a lubricant inlet and a lubricant inlet and is bounded by the air cooling structure. The air cooling structure has an arcuate shape for circumferentially spanning a portion of a gas turbine engine core.

19 Claims, 9 Drawing Sheets

(51) Int. Cl.
*F02C 3/04* (2006.01)
*F02C 7/18* (2006.01)

(52) U.S. Cl.
CPC ...... *F05D 2240/12* (2013.01); *F05D 2250/90* (2013.01); *F05D 2260/213* (2013.01); *F05D 2260/22141* (2013.01); *F05D 2260/50* (2013.01); *F05D 2270/66* (2013.01); *Y02T 50/675* (2013.01)

(56) References Cited

U.S. PATENT DOCUMENTS

| | | | | |
|---|---|---|---|---|
| 4,151,710 A * | 5/1979 | Griffin | | F02C 7/14 184/6.11 |
| 5,269,135 A * | 12/1993 | Vermejan | | F02C 7/04 60/226.1 |
| 5,351,476 A * | 10/1994 | Laborie | | B64D 33/08 60/269 |
| 5,544,700 A * | 8/1996 | Shagoury | | F02C 7/14 165/139 |
| 6,698,691 B2 * | 3/2004 | Porte | | B64D 15/04 244/134 B |
| 7,140,174 B2 * | 11/2006 | Johnson | | F02C 7/042 60/226.1 |
| 7,398,641 B2 * | 7/2008 | Stretton | | F02C 7/047 244/134 B |
| 7,454,894 B2 * | 11/2008 | Larkin | | F01D 25/12 60/226.1 |
| 7,946,806 B2 * | 5/2011 | Murphy | | F02C 7/14 415/145 |
| 8,499,544 B2 * | 8/2013 | Shafer | | F01D 15/10 60/226.1 |
| 9,267,434 B2 * | 2/2016 | Campbell | | F02K 3/115 |
| 9,677,474 B2 * | 6/2017 | Hundley, Jr. | | F02C 7/12 |
| 9,810,150 B2 * | 11/2017 | Schmitz | | F02C 7/14 |
| 9,982,630 B2 * | 5/2018 | Marini | | F02K 3/115 |
| 10,082,079 B2 * | 9/2018 | Todorovic | | F02K 1/54 |
| 10,100,740 B2 * | 10/2018 | Thomas | | F28D 1/0358 |
| 10,125,684 B2 * | 11/2018 | Yu | | F01D 25/14 |
| 10,126,062 B2 * | 11/2018 | Cerny | | F02C 7/185 |
| 10,145,304 B2 * | 12/2018 | Weiner | | F02C 7/14 |
| 2004/0020213 A1 * | 2/2004 | Jones | | F28D 15/02 60/772 |
| 2005/0150970 A1 * | 7/2005 | Beutin | | F02C 7/141 237/12 |
| 2005/0268612 A1 * | 12/2005 | Rolt | | B64D 33/08 60/728 |
| 2006/0042223 A1 * | 3/2006 | Walker | | F01D 9/065 60/39.08 |
| 2006/0042225 A1 * | 3/2006 | Bruno | | F01D 25/12 60/204 |
| 2008/0016845 A1 * | 1/2008 | Zysman | | F01D 25/125 60/226.1 |
| 2008/0053060 A1 * | 3/2008 | Olver | | F02C 7/14 60/226.1 |
| 2008/0095611 A1 * | 4/2008 | Storage | | F01D 25/125 415/116 |
| 2010/0038173 A1 * | 2/2010 | Munson | | F01D 25/16 184/6.11 |
| 2011/0146229 A1 * | 6/2011 | Bajusz | | F28F 9/0075 60/226.1 |
| 2011/0203249 A1 * | 8/2011 | Telakowski | | F01D 25/18 60/39.08 |
| 2012/0168115 A1 * | 7/2012 | Raimarckers | | F01D 25/02 165/41 |
| 2013/0247587 A1 * | 9/2013 | Lo | | F01D 17/105 60/806 |
| 2014/0202158 A1 * | 7/2014 | Storage | | F02C 7/12 60/722 |
| 2015/0198092 A1 * | 7/2015 | Weiner | | F01D 25/12 415/175 |
| 2016/0003190 A1 * | 1/2016 | Weiner | | F02K 1/15 239/265.33 |
| 2016/0047274 A1 * | 2/2016 | Woolworth | | F01D 25/24 415/146 |
| 2016/0319693 A1 * | 11/2016 | Ward | | F04D 29/563 |
| 2016/0333783 A1 * | 11/2016 | Weiner | | F02C 7/06 |
| 2018/0335046 A1 * | 11/2018 | Charier | | B64C 11/325 |

FOREIGN PATENT DOCUMENTS

| | | |
|---|---|---|
| EP | 1916399 A2 | 4/2008 |
| EP | 2339123 A1 | 6/2011 |

OTHER PUBLICATIONS

International Search Report for International Application No. PCT/US2014/071832; dated Mar. 30, 2015.
Written Opinion for International Application No. PCT/US2014/071832; dated Mar. 30, 2015.
European Office Action for Application No. 14 878 605.6; dated Jul. 4, 2019.

* cited by examiner

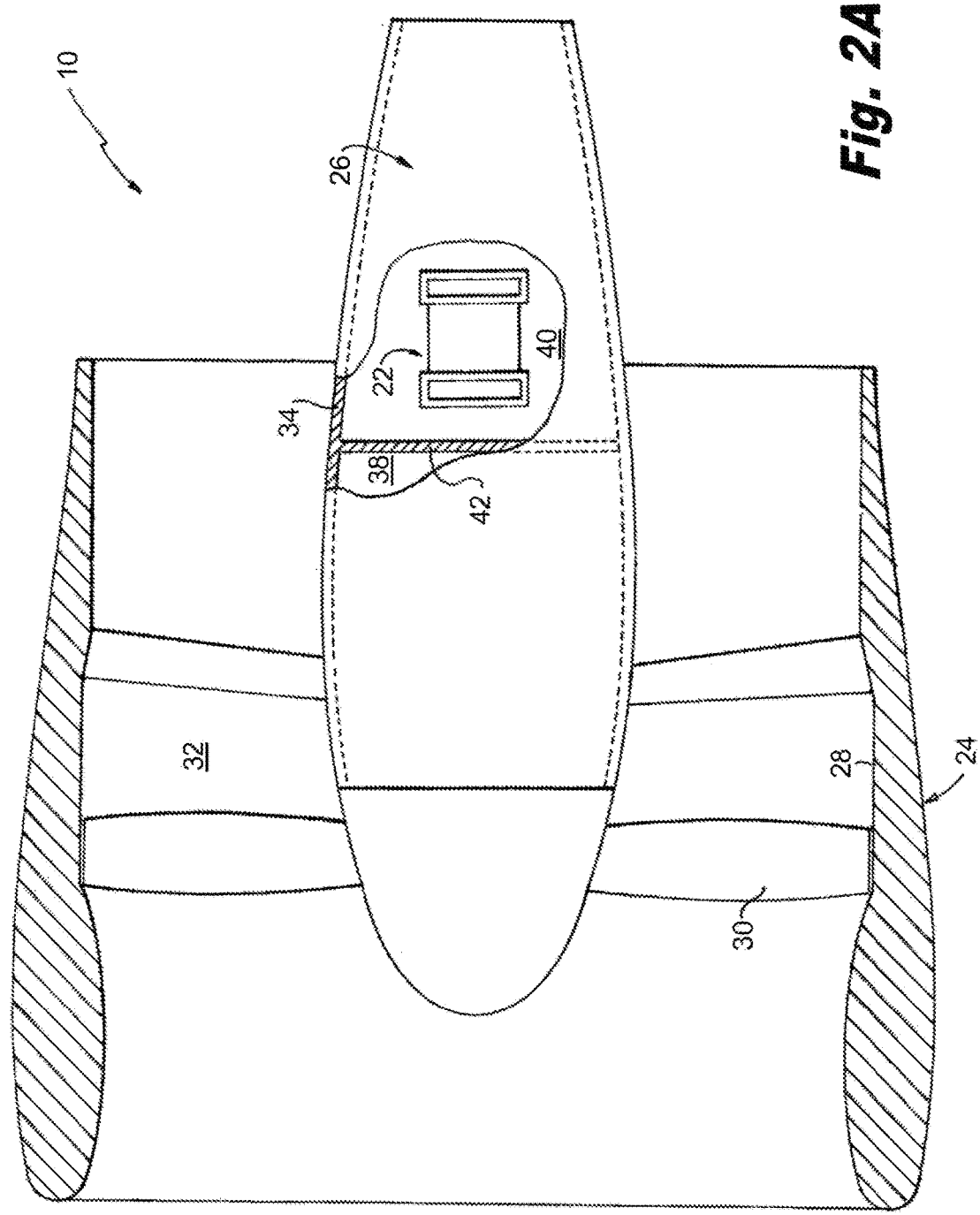

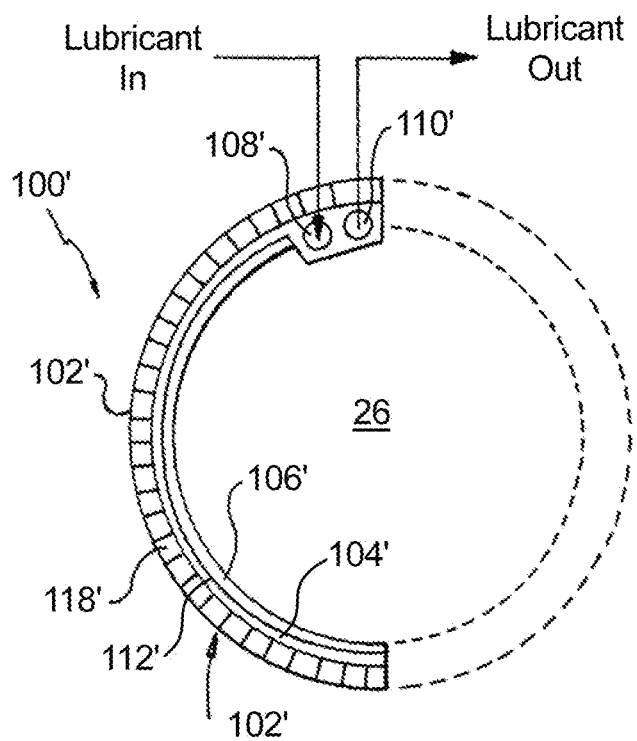
*Fig. 4A*
*Fig. 4B*
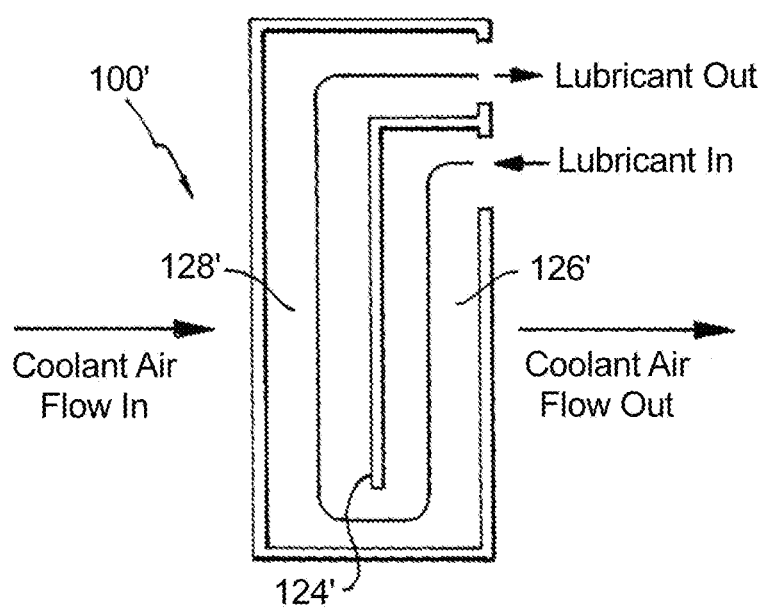

COOLING SYSTEMS FOR GAS TURBINE ENGINES

RELATED APPLICATIONS

The application is a National Phase Application of Patent Application PCT/US2014/071832 filed on Dec. 22, 2014, which claims the benefit of and priority to U.S. Provisional Patent Application No. 61/927,766 filed Jan. 15, 2014, the contents each of which are incorporated herein by reference in their entirety.

BACKGROUND OF THE INVENTION

1. Field of the Invention

The present disclosure relates to gas turbine engine cooling systems, and more particularly to lubricant cooling systems for gas turbine engines.

2. Description of Related Art

Gas turbine engines typically include lubrication systems for providing lubricant to engine components like bearings and gears. Such systems generally include a lubricant collection tank and pump arranged in a lubricant circuit for circulating lubricant through the lubricated components. Lubricant collects in the tank after traversing the lubricated component(s). It then flows to the pump which increases its pressure, forcing the lubricant through the lubricant circuit to the lubricated components(s) for a subsequent cycle through the lubrication circuit.

Lubricant typically acquires heat as it traverses the lubricated components. Some engine lubrication systems include a lubricant cooler arranged in the lubricant circuit for removing heat from the lubricant, such as a fuel-oil cooler or an air-oil cooler. Fuel-oil coolers transfer heat from the lubricant into fuel as the fuel flows the engine. Air-oil coolers transfer heat from the lubricant into an airflow, typically acquired from the external environment or from working fluid flowing through the engine.

Such conventional cooling systems have generally been considered satisfactory for their intended purpose. However, there is a need in the art for improved cooling systems. There is also a need for lubricant cooling systems that are relatively compact and efficient. The present disclosure provides a solution for these needs.

SUMMARY OF THE INVENTION

An air-oil cooler includes a lubricant channel extending between a lubricant inlet and a lubricant outlet. An air cooling structure bounds the lubricant channel and has an arcuate shape for circumferentially spanning at least a portion of a gas turbine engine core In certain embodiments, the air-oil cooler can span the circumference of the core of the engine. The lubricant inlet and outlet can be on opposite ends of the air cooling structure or on a common end of the air cooling structure. The common end of the air cooling structure can be an upper end or lower end portion of the air cooling structure. A lubricant channel can extend between an inlet and outlet defined on opposite ends of the air cooling structure. A lubricant bypass channel radially inward of and in parallel with the air-oil cooler lubricant channel. The bypass channel can be in thermal communication with the lubricant channel for heating lubricant within the lubricant channel. An apportionment device can fluidly couple both channels with the engine lubricant channel for varying lubricant flow between the channels based on lubricant temperature. The apportionment device can be a pressure relief valve or an orifice plate.

In accordance with certain embodiments, an air cooling structure has a curved shape conforming to an exterior surface of the engine core. The air cooling structure can span a portion of the engine core. The arcuate shape can span a circumference of the engine core. The air cooling structure can be a first air cooling structure and a second air cooling structure can be arranged circumferentially adjacent to the first air cooling structure. The second air cooling structure can be in fluid communication with the same lubricant circuit as the first air oil cooling structure. The second air cooling structure can be in fluid communication with a separate lubricant circuit from that of the first air oil cooling structure.

It is further contemplated that the air cooling structure can have a fin for facilitating heat transfer been the lubricant and air traversing the air cooling structure. The fin can be on either the air side of the air cooling structure or the lubricant side of the air cooling structure. The fin can be a first fin and the air cooling structure can include a second fin on the lubricant side of the air cooling structure. The fin can be angled with respect to the lubricant channel. The fin angle can be a 90-degree angle or other suitable angle. A shroud can couple to the fin at a radially outer end of the fin for reducing drag associated with air flowing across the air cooling structure.

In accordance with certain embodiments, an air diverter is in selective fluid communication with the air-oil cooler for providing an airflow to the air-oil cooler from the external environment. The air diverter can include a nozzle flap coupled to a synchronization ring. The synchronization ring can be on the forward or aft end of the nozzle flap. A link with devises or ball joints can couple the nozzle flap to the synchronization ring. An actuator coupled to the synchronization ring can move the synchronization ring between first and second positions. Airflow to the air cooling structure can be greater in the second position than in the first position.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 2A is a partial cross-sectional side view of a gas turbine engine, showing conventional air-oil cooler;

FIG. 4A and FIG. 4B are schematic cross-sectional side views of another embodiment of the oil air cooler of FIG. 1, showing lubricant channels of the air-oil cooler, respectively;

DETAILED DESCRIPTION OF THE PREFERRED EMBODIMENTS

Figure 1:
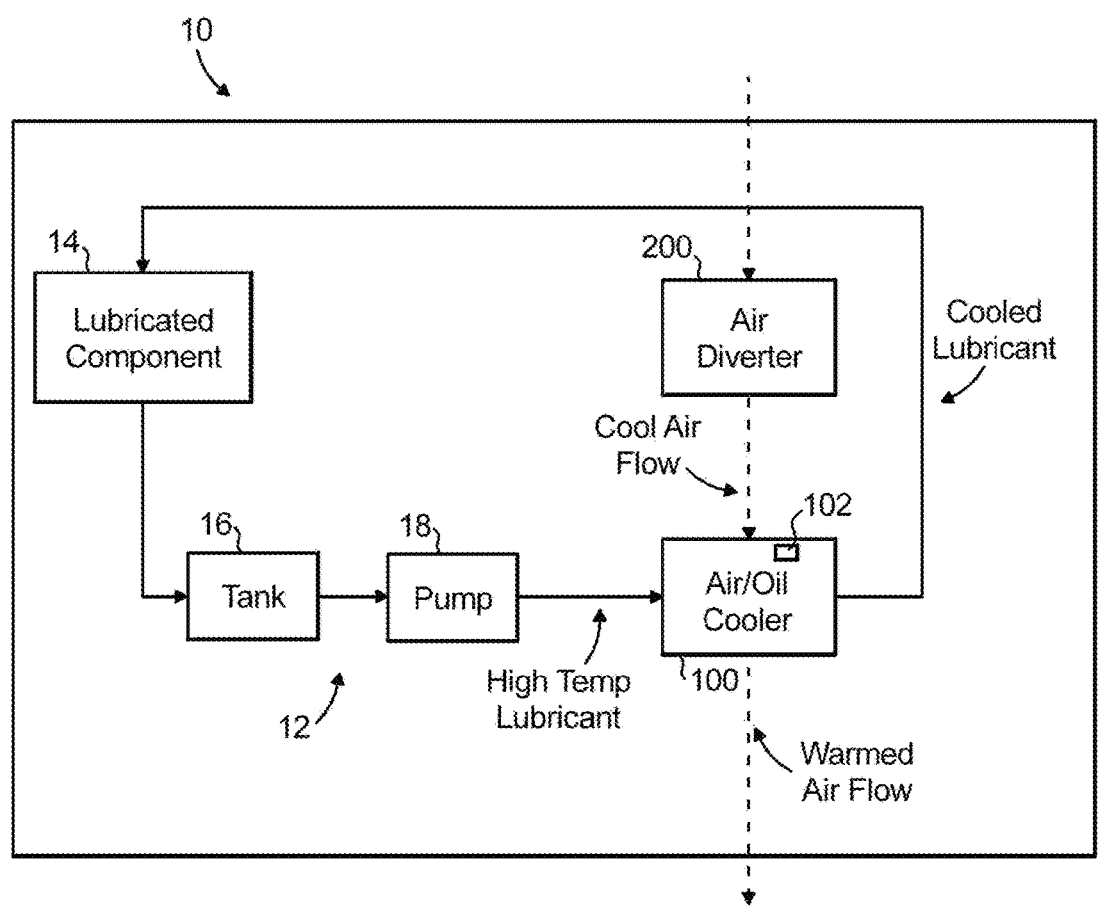
FIG. 1 is a schematic view of a gas turbine engine with a lubrication system according to an embodiment, showing an air-oil cooler and air diverter.

Reference will now be made to the drawings wherein like reference numerals identify similar structural features or aspects of the subject disclosure. For purposes of explanation and illustration, and not limitation, a gas turbine engine in accordance with the present disclosure is shown in FIG. 1 and is generally indicated with reference numeral 10. Other embodiments gas turbine engine 10, or aspects thereof, are provided in FIGS. 2-8, as will be described. The systems and methods described herein can be used in aircraft engines, such as main engines and auxiliary power units for example.

Gas turbine engine 10 includes a lubrication system 12 with a lubricated component 14, a lubricant tank 16, a lubricant pump 18, and an air-oil cooler 100 in selective fluid communication with an air diverter 200. Lubricated component 14 can be a bearing, gear such as a gear coupling a fan to an engine core of gas turbine engine 10, or any other component requiring a supply of lubricant for reliable operation.

Lubrication system 12 includes a plurality of lubricant passages interconnecting lubricated component 14, lubricant tank 16, lubricant pump 18, and air-oil cooler 100. Each of lubricated component 14, lubricant tank 16, lubricant pump 18, and air-oil cooler 100 are in fluid communication with one another through one or more lubricant passages of lubricant system 12, thereby forming a lubricant circuit. Lubricant tank 16 collects lubricant after it traverses lubricated component 14. Lubricant pump 18 draws lubricant from lubricant tank 16 and forces the lubricant through air-oil cooler 100. Air-oil cooler 100 cools the lubricant using an airflow provided by air diverter 200. Lubricant thereafter flows to lubricated component 14 for a successive traversal of lubricated component 14.

Air-oil cooler 100 includes an air cooling structure 102 configured for removing heat from lubricant flowing through air-oil cooler 100, thereby maintaining the lubricant within a predetermined temperature range. Air cooling structure 102 is in fluid communication with lubrication system 12 and with the airflow provided by air diverter 200. Air cooling structure 102 is configured for transferring heat between the lubricant and airflow.

Air diverter 200 is in selective fluid communication with the external environment and is configured for selectively providing the airflow to air-oil cooler 100. Air diverter 200 varies the airflow based on an operational condition, such as lubricant temperature or the temperature of the external environment for example. Air diverter 200 is configured for increasing or reducing the airflow provided to air-oil cooler 100 based on the at least one operational condition. This enables matching the heat rejection capability of air-oil cooler 100 to the heat rejection need of lubrication system 12.

Figure 2B:
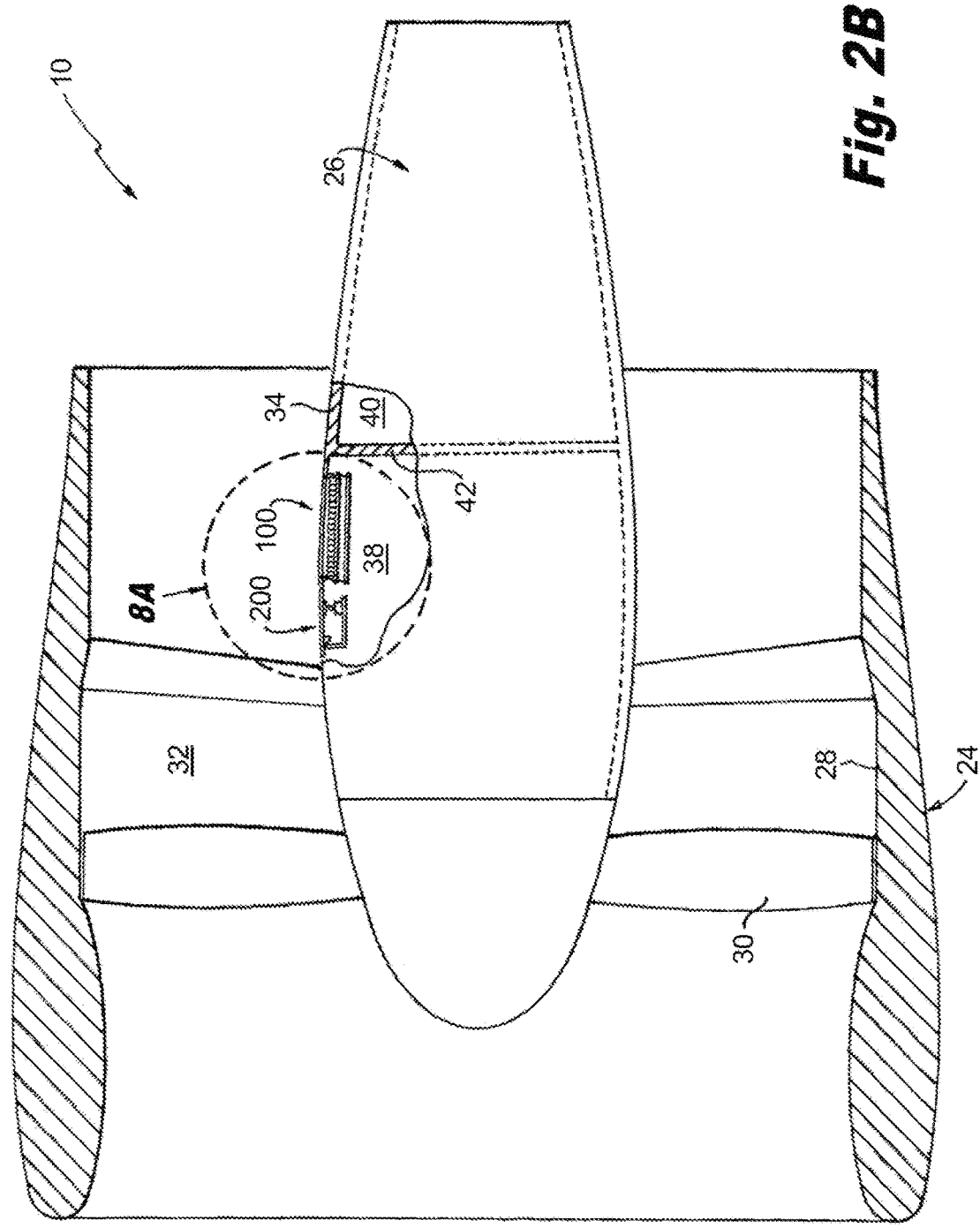
FIG. 2B is a partial cross-sectional side view of a gas turbine engine, showing an air-oil cooler and air diverter in accordance with the present disclosure.

With reference to FIG. 2A and FIG. 2B, a gas turbine engine 10 is shown. Gas turbine engine 10 includes a fan section 24, a core nacelle 34, and an engine core 26. Fan section 24 includes a fan shroud 28 enclosing a fan 30 and defining a bypass duct 32. Fan 30 connects to and is operatively associated with engine core 26. Fan shroud 28 defines a bypass duct 32. Fan 30 couples to a forward end of engine core 26. Engine core 26 contains rotating machinery including a low-pressure spool coupled to fan 30 and a high-pressure spool.

Core nacelle 34 surrounds engine core 26. An inner surface of core nacelle 34 and an outer surface of engine core 26 define a first compartment 38, e.g. a 2.5 bleed compartment, and a second compartment 40, e.g. a core compartment, separated by a firewall 42. First compartment 38, is arranged axially forward of second compartment 40 and contains air-oil cooler 100. Second compartment 40 is larger than first compartment 38. In the engine arrangement shown in FIG. 2A, second compartment 40 houses conventional air-oil cooler 22 (shown with dashed lines for illustration purposes). In the engine arrangement shown in FIG. 2B, first compartment 38 houses air diverter 200 and air-oil cooler 100. Conventional air-oil cooler 22 occupies a larger radial installation envelope than air diverter 200 and air-oil cooler 100.

Figure 3A:
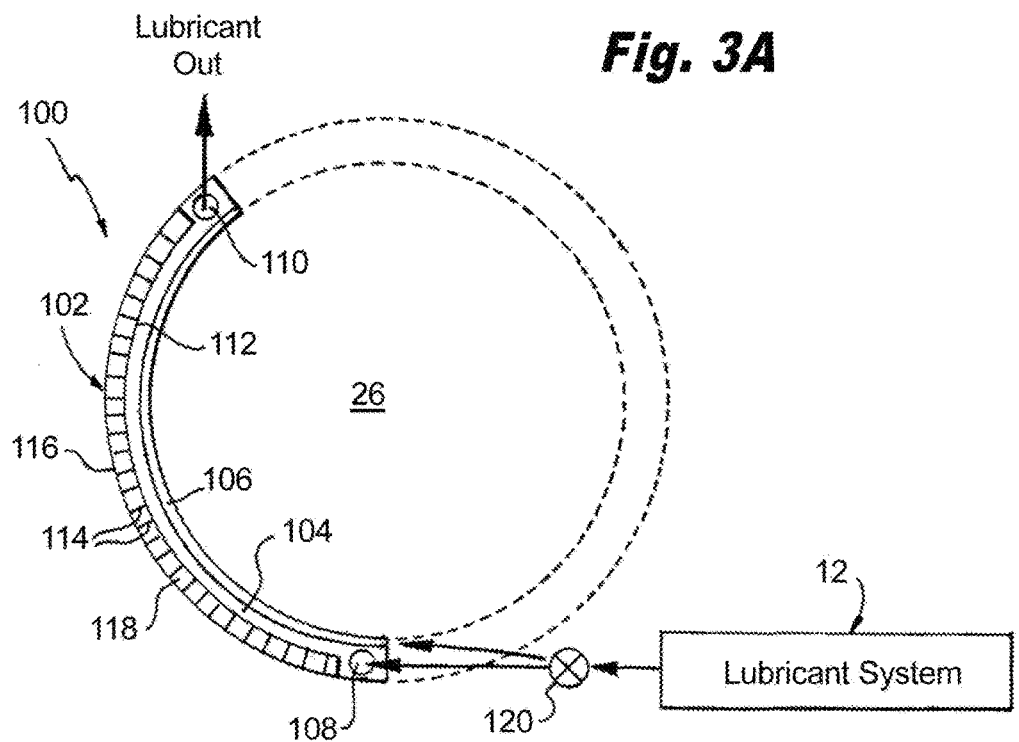
FIG. 3A and FIG. 3B are schematic cross-sectional side views of an embodiment of the air-oil cooler of FIG. 1, showing lubricant channels of the air-oil coolers, respectively.

With reference to FIG. 3A, air-oil cooler 100 is shown. Air-oil cooler 100 includes an air cooling structure 102, a lubricant channel 104, a bypass channel 106, and an apportioning device 120 integral with air-oil cooler 100, but shown external to air-oil cooler to show functionality. Air cooling structure 102 extends about a portion of a circumference of engine core 26. Lubricant channel 104 and bypass channel 106 also extend a portion of engine core 26 and are in fluid communication with lubricant system 12.

Air cooling structure 102 bounds lubricant channel 104, includes a lubricant inlet 108 and a lubricant outlet 110, and has divider 112, e.g. a separator plate. Lubricant channel 104 extends between lubricant inlet 108 and lubricant outlet 110. Divider 112 separates a radially outer air side of air cooling structure 102 from a radially inner lubricant side of air oil cooling structure 102, and is configured to transfer heat from the lubricant side to the air side through divider 112. The air side of air cooling structure 102 includes a plurality of air side fins 114 and a shroud 116. The oil side of air-oil cooler 100 includes lubricant channel 104 and lubricant bypass channel 106.

Air cooling structure 102 has a curved shape. The curved shape can be arcuate segment conforming to an exterior contour of engine core 26 of relatively thin radial thickness. This allows for incorporation of air-oil cooler 100 in first compartment 38, freeing space within second compartment 40 (shown in FIG. 2) for other engine components and/or reducing the diameter of core nacelle 34.

Lubricant inlet 108 and lubricant outlet 110 are on opposite ends of air cooling structure 102. Lubricant inlet 108 is on a lower portion of air-oil cooler 100. Lubricant outlet 110 is on an upper portion of air-oil cooler 100. As illustrated, lubricant inlet 108 and lubricant outlet 110 are located on a common face of air cooling structure 102. Lubricant inlet 108 and lubricant outlet 110 also circumferentially adjacent to both lubricant channel 104 and the air side of air-oil cooler 100. This arrangement allows for air-oil cooler 100 to have a thin radial cross-section, allowing housing of air-oil cooler 100 in first compartment 38. Embodiments of air-oil cooler 100 can have a radial thickness of about 1.75 inches (about 4.4 centimeters).

Fins 114 extend radially outward from air cooling structure 102 and are orthogonal with respect to lubricant channel 104. Fins 114 also extend axially along air cooling structure 102 in a direction parallel with engine axis R. A shroud 116 connects to fins 114 at radially outward ends of fins 114, thereby defining air passages 118 on its radially inner surface and defining an aerodynamically efficient surface on its radially outer surface. Shroud 116 can form a portion of the exterior of core nacelle 34. This provides for reduced aerodynamic losses by forming a smooth external flow surface when air diverter 200 (shown in FIG. 1) is closed, such as during periods where cooling requirements are relatively low or ambient air is extremely cool. Notably, air cooling structure 102 rejects heat to the external environment when no air flows through air passages 118 as heat conducts through divider 112, fins 114, and shroud 116 and then convects from shroud 116 into fan air.

Conventional curved surface air-oil coolers can provide supplemental heat rejection, such as for electric generator cooling. However, such conventional air-oil coolers generally have limited heat rejection capability and incur an engine performance penalty because the air-side fins are of open design resulting in air pressure drop and fluid cooling, even when cooling is not required. Embodiments of air-oil coolers having shrouds as described herein, i.e. with a closed design, can provide high heat rejection capability without incurring the engine performance penalty associated with conventional air-oil coolers having open fin designs.

Lubricant bypass channel 106 forms a parallel lubricant passage adjacent to and radially inward of lubricant channel 104. Apportioning device 120, coupled between lubrication system 12 and lubricant channel 104 and lubricant bypass channel 106, apportions lubricant from lubrication system 12 (shown in FIG. 1) into separate flows directed into lubricant channel 104 and bypass channel 106. Since lubricant bypass channel 106 is in thermal communication with lubricant channel 104, increasing lubricant directed to lubricant bypass channel 106 can increase the temperature of lubricant traversing (or occluding) lubricant channel 104. This potentially improves the tolerance of gas turbine engine 10 for operation in cold environments by preventing lubricant from congealing in lubricant channel 104. It can also decongeal congealed lubricant accumulated within lubricant channel 104 resulting from operation in extremely cold environments. Apportioning device 120 can be a pressure relief valve or a variable orifice by way of non-limiting example.

Figure 3B:
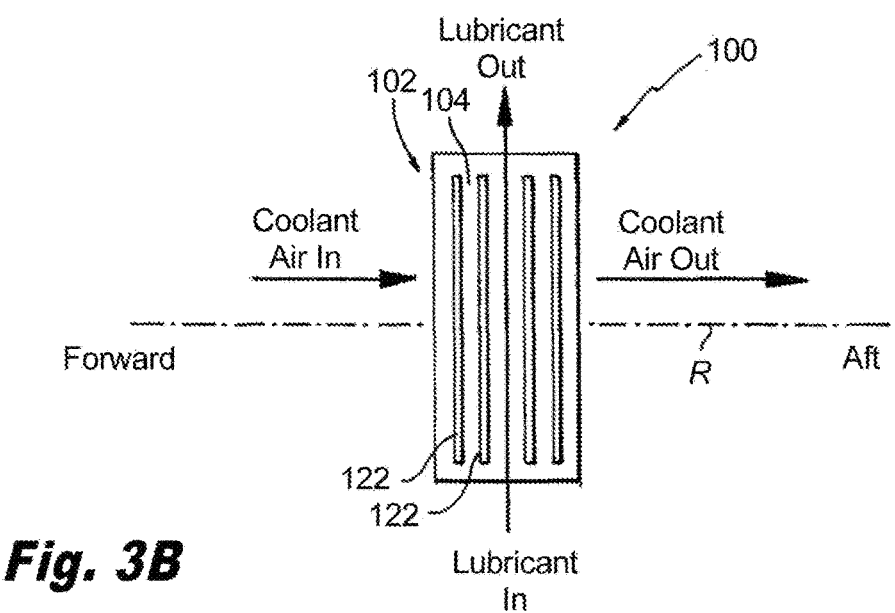

With reference to FIG. 3B, air-oil cooler 100 is shown in a cross-sectional side view. Lubricant flows through lubricant channel 104 circumferentially about engine axis R between lubricant inlet 108 and lubricant outlet 110. An oil side fin 122 within lubricant channel 104, four shown for illustration purposes, couples to divider 112 (shown in FIG. 3A) and extends along the length of lubricant channel 104 and circumferentially about engine axis R. Oil side fin 122 increases exposure of lubricant traversing lubricant channel 104 to air cooling structure 102, increasing heat transfer between the lubricant and air cooling structure 102.

Air-oil cooler 100 is a cross flow air-oil cooler wherein coolant flowing through air passages 118 is orthogonal relative to lubricant flowing through lubricant channel 104. As illustrated, coolant air flows at a 90-degree angle relative to lubricant flowing through lubricant channel 104. Air-oil cooler 100 is also a single-pass air-oil cooler as lubricant flowing through lubricant channel 104 traverses the length of air cooling structure 102 a single time. This potentially reduces pressure drop experienced by lubricant as it traverses lubricant channel 104.

With reference to FIG. 4A and FIG. 4B, an air-oil cooler 100' is shown. Air-oil cooler 100' is similar to air-oil cooler 100 and additionally includes an air cooling structure 102', a lubricant channel 104', a decongeal bypass channel 106', a lubricant inlet 108', a lubricant outlet 110', and an apportionment device 120' configured for splitting lubricant flow between lubricant channel 104' and decongeal bypass channel 106'. With reference to FIG. 4B, lubricant channel 104' includes a partition 124' that segments lubricant channel 104' into a first channel portion 126' and a second channel portion 128', thereby forming a two-pass lubricant flow arrangement.

First channel portion 126' and second channel portion 128' have respective lengths that are about equivalent to a length of air cooling structure 102'. First channel portion 126' is in fluid communication with lubricant inlet 108' on one end and is in fluid communication with second channel portion 128' on its opposite end forming the first pass of lubricant by the coolant air flow. Second channel portion 128' is in fluid communication with first channel portion 126' on one end and is in fluid communication with lubricant outlet 110' on its opposite end forming the second pass of lubricant by the coolant air flow. This increases the amount of heat transfer between lubricant and coolant (i.e. airflow) traversing air cooling structure 102', increasing the heat rejection capability of air-oil cooler 100'.

Lubricant inlet 108' and lubricant outlet 110' are both arranged on an upper portion of air cooling structure 102'. This reduces lubricant drain back at engine shutdown and lubricant gulp at engine startup that can be experienced by air-oil coolers with lubricant inlets and/or outlets arranged on a lower portion of the air-oil cooler due to gravity. Drain back events occur when pumping pressure is reduced or removed, such as at engine shutdown, allowing lubricant flow to drain out of the air-oil cooler and flow backwards into the lubricant system. Gulp events occur when pumping pressure is restored, such as at engine startup, lubricant flow to lubricated components lagging startup due to the air-oil cooler refilling with lubricant. Drain back and gulp can each interrupt lubricant flow to lubricated components, adversely affecting engine reliability. Placing lubricant inlet 108' and lubricant outlet 110' on the upper portion of air cooling structure 102' can reduce the potential for interruptions to lubricant flow to lubricated components as lubricant channel 104' remains charged with lubricant upon reduction (or loss) of pumping pressure.

Air-oil cooler 100' spans about half of the circumference of engine core 26. In certain embodiments, a second air-oil cooler (not shown for clarity purposes) can be arranged circumferentially adjacent to air-oil cooler 100' to provide additional lubricant cooling capability. The second air-oil cooler can supplement the heat rejection capability of air-oil cooler 100'. The second air-oil cooler can also provide heat rejection capability for a second lubrication circuit (not shown for clarity purposes), such as for a generator for example. Such air-oil cooler arrangements would have a split ring arrangement and be formed from two or more arcuate segments which could be installed or removed separately, facilitating engine fabrication and in-service maintenance.

Figure 5A:
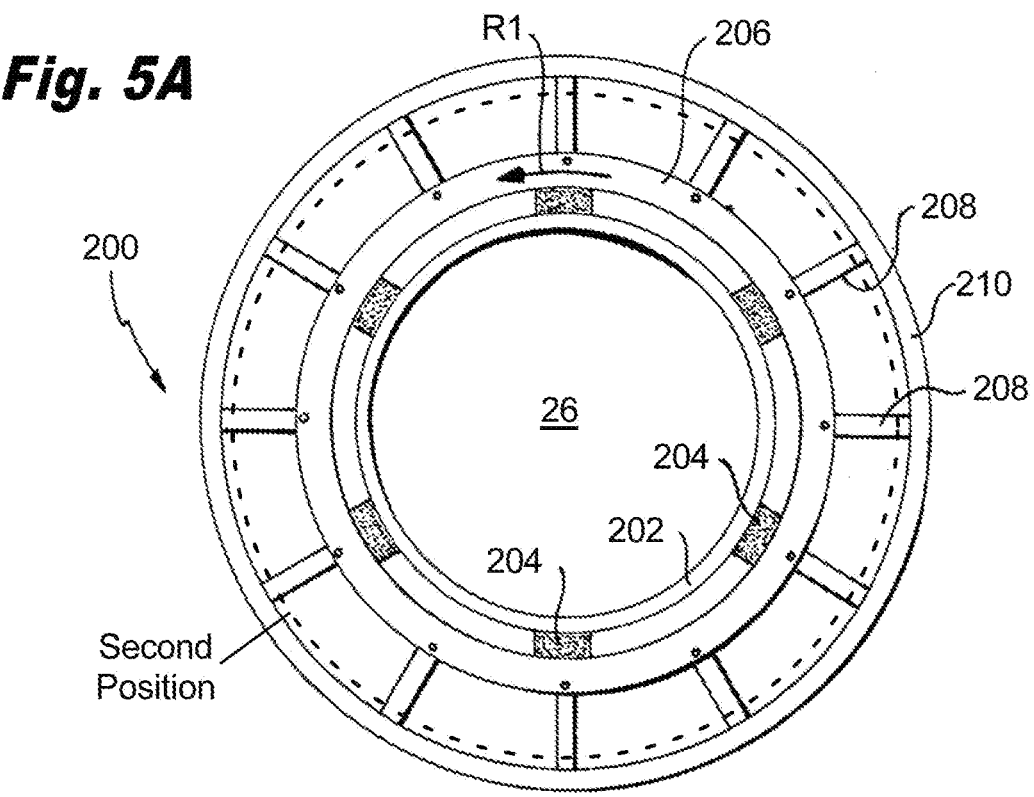
FIG. 5A and FIG. 5B are schematic cross-sectional end views of the air diverter of FIG. 1, showing the air diverter synchronization ring in first and second positions, respectively.

With reference to FIG. 5A air diverter 200 is shown. Air diverter 200 includes a guide ring 202, bumpers 204, a synchronization ring 206, idler links 208, and overlapping nozzle flaps 210. Guide ring 202 is adjacent to engine core 26 and circumferentially surrounds engine core 26. Bumpers 204 are radially outward of guide ring 202 and form arcuate segments circumferentially arranged about guide ring 202. Synchronization ring 206 is radially outward of bumpers 204 and circumferentially surrounds bumpers 204. Nozzle flaps 210 are radially outward of synchronization ring 206 and extend from a forward end toward the aft end of gas turbine engine 10. Idler links 208 extend radially from synchronization ring 206 to nozzle flaps 210.

Air diverter 200 spans the full circumference of engine core 26 and is disposed within the first compartment 38 (shown in FIG. 2). In certain embodiments, air diverter 200 spans less than the full circumference of engine core 26. In these embodiments, a fixed area nozzle section can perform the functions of idler links 208 and nozzle flaps 210.

Guide ring 202 provides radial and axial alignment of the synchronization ring 206 with respect to engine core 26. Guide ring 202 has a split configuration with a radial parting line. This allows guide ring 202 to be formed from two or more separate arcuate segments coupled to one another to form a ring spanning the circumference of engine core 26. This can simplify assembly and in-service maintenance of gas turbine engine 10.

Bumpers 204 attach to the synchronization ring 206 and are movable circumferentially with respect to guide ring 202. Bumpers 204 provide a low friction, shock and vibration resistant sliding surface between the synchronization ring 206 and guide ring 202. In certain embodiments, shims radially position bumpers 204 to establish radial clearance between the synchronization ring 206 and guide ring 202. In some embodiments, bumpers 204 are spring-loaded for automatically adjusting radial clearance between bumpers 204 and guide ring 202. To ensure smooth operation, i.e. free from snagging or binding between moving and static surfaces, bumpers 204 mount to the synchronization ring 206 in positions that do not coincide with the guide ring parting line.

Synchronization ring 206 is rotatable in both clockwise and counterclockwise directions circumferentially about engine core 26 for synchronous actuation of nozzle flaps 210. Synchronization ring 206 rotates through a predetermined angular movement range with respect to engine core 26 between a first position, shown in FIG. 5A, and a second position, shown in FIG. 5B. An actuator 220 (shown in FIG. 7A and described below) drives synchronization ring 206 through a predetermined angular range to move between its first and second position. Synchronization ring 206 can have a split configuration formed from two or more arcuate segments coupled together to circumferentially span engine core 26. This can simplify assembly and in-service maintenance of gas turbine engine 10.

Idler links 208 interconnect synchronization ring 206 to nozzle flaps 210. Idler links 208 are configured for converting rotation of synchronization ring 206 into radial displacement of respective ends of nozzle flaps 210. Radial displacement of respective ends of nozzle flaps 210 in turn establishes the amount of air admitted to air-oil cooler 100 from bypass duct 32 (shown in FIG. 2).

As shown in FIG. 5A, air diverter 200 is in a first position. Respective axes defined by idler links 208 are orthogonal with respect to synchronization ring 206, placing respective nozzle flaps 210 in a closed position and preventing air from entering oil-air cooler 100 as indicated in the embodiment shown in FIG. 8A. This reduces heat rejection capability of air-oil cooler 100 and reduces efficiency losses from air flowing across the surfaces defining air passages 118 (shown in FIG. 3A).

Nozzle flaps 210 circumferentially overlap one another to form a variable area nozzle. Air diverter 200 can be an annular nozzle with respective nozzle flaps 210 hinged at a forward portion of nozzle flaps 210 (shown in FIG. 6). Alternatively, air diverter 200 can be an annular pop-up scoop. Embodiments of air diverter 200 forming a pop-up scoop have nozzle flaps hinged at respective aft end portion of nozzle flaps 210 (omitted for clarity purposes). The angle the nozzle makes relative to the nominal airflow is sufficiently small such that airflow does not separate from the surface of nacelle 34 (shown in FIG. 2), otherwise increasing drag and reducing efficiency.

Figure 5B:
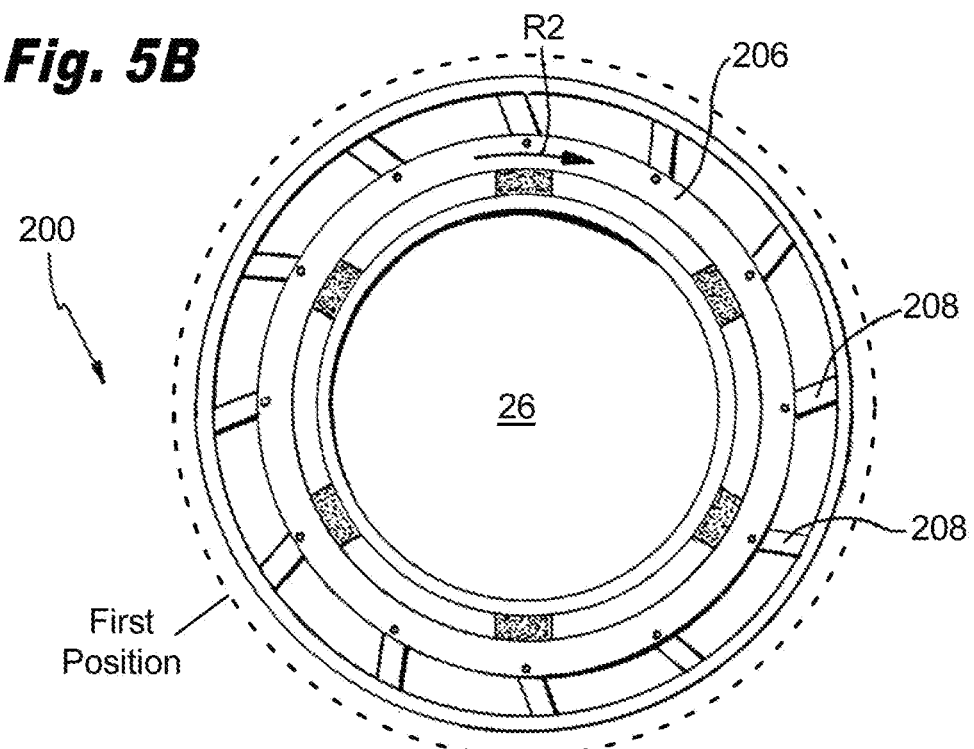

With reference to FIG. 5B synchronization ring 206 is shown in a second position. In the second position, axes defined by idler links 208 are angled with respect to synchronization ring 206. This places respective nozzle flaps 210 in an open arrangement as illustrated the embodiment shown in FIG. 8B, allowing air from bypass duct 32 to enter oil-air cooler 100 (shown in FIG. 2).

With reference to FIG. 5A and FIG. 5B, synchronization ring moves from its first position to its second position by rotating about engine core 26 in a second direction R2. Rotating in second direction R2 changes the orientation of idler links 208 from the normal orientation (shown in FIG. 5A) to the angled orientation (shown in FIG. 5B). Changing the orientation in turn displaces respective ends of nozzle flaps 210 radially inward with respect to engine core 26.

This places air passages 118 (shown in FIG. 3A) in fluid communication with bypass duct 32 (shown in FIG. 2), admits air into oil-air cooler 100 from bypass duct 32, and increases heat rejection capability of air-oil cooler 100.

Synchronization ring moves from its second position (open configuration) to its first position (closed configuration) by rotating about engine core 26 in a first direction R1. Rotating in first direction R1 returns the orientation of idler links 208 from the angled orientation (shown in FIG. 5B) to the normal orientation (shown in FIG. 5A). Changing the orientation in turn displaces respective ends of nozzle flaps 210 radially outward with respect to engine core 26. This isolates air passages 118 (shown in FIG. 3A) from airflow in bypass duct 32 (shown in FIG. 2), reducing heat rejection capability of air-oil cooler 100.

Figure 6:
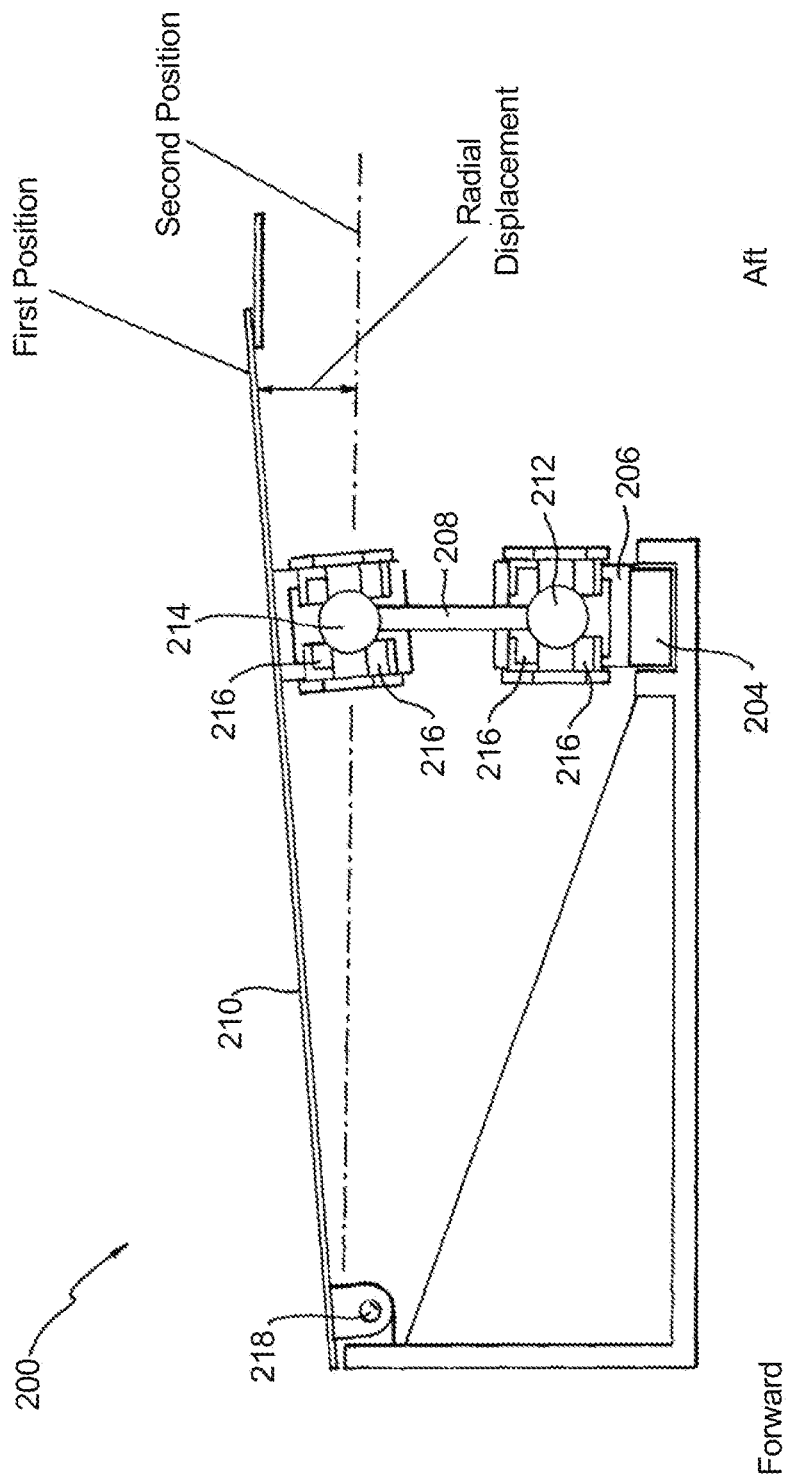
FIG. 6 is side view of the air diverter of FIG. 5A and FIG. 5B, showing a link coupling the air diverter synchronization ring and nozzle flap, according to an embodiment.

With reference to FIG. 6, a side view of a portion of air diverter 200 is shown. Idler links 208 (only one shown for clarity purposes) include a first ball joint 212, a second ball joint 214, compression rings 216, and a hinge 218. First ball joint 212 connects idler link 208 to synchronization ring 206. Second ball joint 214 connects idler link 208 to nozzle flap 210. Compression rings 216 seat over first and second ball joints 212 and 214, respectively, thereby providing relatively large angular displacement and axial displacement of both idler link 208 and nozzle flaps 210 for movement between the air diverter first position (shown in FIG. 5A) and the air diverter second position (shown in FIG. 5B). Hinge 218 couples a forward end of nozzle flap a support structure of air diverter 200.

Figure 7A:
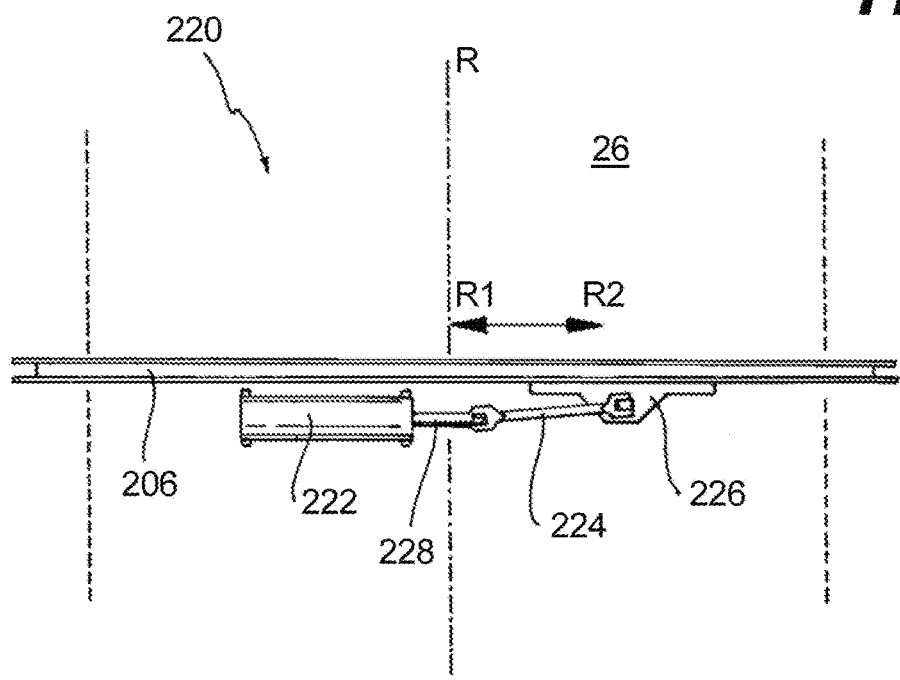
FIG. 7A and FIG. 7B are plan views of embodiments of actuators for air diverter of FIG. 5A and FIG. 5B, showing lateral and longitudinal actuator arrangements, respectively.

With reference to FIG. 7A, an actuator 220 for air diverter 200 is shown. Actuator 220 includes a linear actuator 222, a link 224, and a bracket 226. Linear actuator 222 connects to engine core 26 and includes an actuator rod 228 configured for linear displacement in direction orthogonal with respect to engine axis R. Linear actuator 222 connects directly to engine core 26 for rotating synchronization ring 206 about engine axis R. It is also contemplated that linear actuator 222 can couple to engine core 26 through an intermediate structure, such as a stationary support structure associated with air diverter 200.

Linear actuator 222 can be hydraulically actuated or electrically actuated and is fixed with respect to engine core 26. This can improve reliability as hydraulic service hoses or electrical cables powering linear actuator 222 can also be fixed, reducing the likelihood of wear due to rubbing. In embodiments, linear actuator 222 includes feedback provisioning for report the position of synchronization ring 206 to an engine control system (not shown for clarity purposes). In embodiments, linear actuator 222 is configured to position synchronization ring in a default, third position that is between the first and second position in the event of loss of hydraulic pressure or power. This third position is a fail-safe position that configures synchronization ring 206 in a rotational position that admits sufficient coolant to air-oil cooler 100 for reliable operation of gas turbine engine 10.

Link 224 includes ball joints coupling opposite ends of link 224 to actuator rod 228 and bracket 226, respectively. This can compensate for misalignment between linear actuator 222 and link 224. In certain embodiments, link 224 has clevis formed on opposite ends with similar function and advantage.

Bracket 226 couples to synchronization ring 206 on a forward or aft end of synchronization ring 206. As linear actuator 222 extends or retracts actuator rod 228 laterally with respect to engine axis R, synchronization ring 206 rotates about engine axis R in first direction R1 or second direction R2. This moves synchronization ring between its first and second position as described above.

Figure 7B:
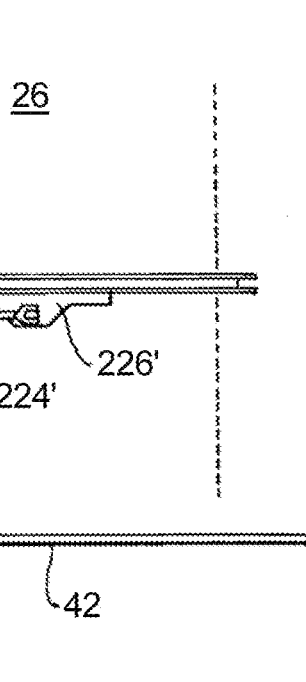

With reference to FIG. 7B, an actuator 220' is shown. Actuator 220' is similar to actuator 220 and additionally includes a bell crank 230' and a link 232'. Linear actuator 222' is parallel to engine axis R, extending along a length of engine core 26. Bell crank 230' connects bracket 226' to linear actuator 222' through link 232' and link 224'. Link 232' is orthogonal with respect synchronization ring 206, and bell crank 230' is configured to convert linear motion of actuator rod 228' in a direction parallel to engine axis R to lateral motion orthogonal with respect to engine axis R.

Actuator 220' can provide packaging flexibility by allowing packaging of linear actuator 222' in second compartment 40 aft of firewall 42. Advantageously, in embodiments of gas turbine engine 10 where fuel lines cannot be run within first compartment 38, embodiments of actuator 220' allow for powering linear actuator 222' hydraulically using high-pressure fuel. This potentially simplifies the construction of gas turbine engine 10.

Figure 8A:
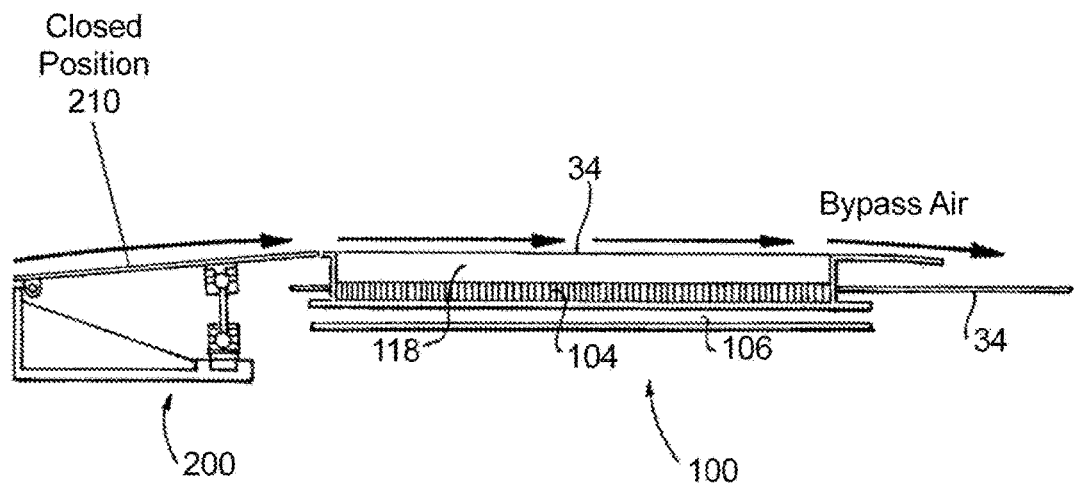
FIG. 8A and FIG. 8B are cross-sectional side views of the air-oil cooler and air diverter of FIG. 1, showing an air diverter with a nozzle design in the first and second positions, respectively.
Figure 8B:
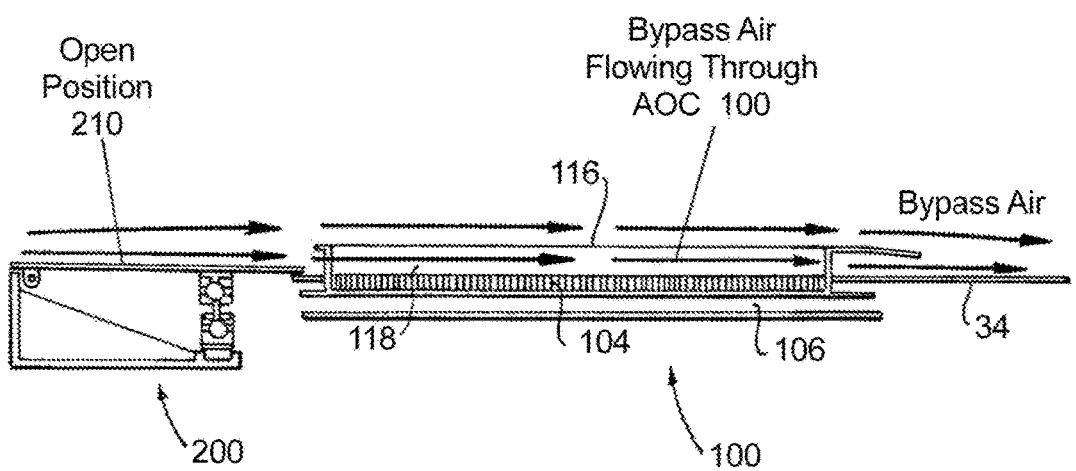

With reference to FIG. 8A and FIG. 8B, air-oil cooler 100 and air diverter 200 are shown. Air-oil cooler 100 and air diverter 200 are each disposed within in first compartment 38. Air diverter 200 is forward of air-oil cooler 100 and is in fluid communication with bypass air traversing bypass duct 32. Air-oil cooler 100 is in selective fluid communication with bypass air traversing bypass duct 32 through air diverter 200. Air-oil cooler 100 is also in thermal communication with bypass air traversing bypass duct 32 through core nacelle 34, lubricant traversing lubricant channel 104, and lubricant traversing bypass channel 106.

With reference to FIG. 8A, nozzle flap 210 is shown in the closed position. In the closed position, bypass air traversing bypass duct 32 does not enter air passages 118 (one shown for clarity purposes). This reduces the efficiency of air-oil cooler 100 and reduces the amount of heat transferred from lubricant traversing lubricant channel 104 and the external environment. It also can improve engine efficiency by reducing drag associated with air flowing through air passages 118. Some heat transfer still occurs from heat conduction through the fins 114 and shroud 116 of air cooling structure 102 into the airflow traversing bypass duct 32 on the exterior of core nacelle 34.

With reference to FIG. 8B, nozzle flap 210 is shown in the open position. In the open position, bypass air traversing bypass duct 32 enters air passages 118 (one shown for clarity purposes). This increases the efficiency of air-oil cooler 100 and increases the amount of heat transferred from lubricant traversing lubricant channel 104 and the external environment. It can reduce engine efficiency by increasing drag associated with air flowing through air passages 118. In is contemplated that air diverter 200 can be a modulating air diverter where synchronization ring 206 is configured for positioning nozzle flap 210 radially between the first position and second to match a temporal heat rejection requirement with a temporal heat rejection capability of air-oil cooler 100. This matches heat rejection capability with heat rejection requirements as the latter changes during operation of gas turbine engine 10 (shown in FIG. 1).

Embodiments including a bypass channel 106 radially inward of air-oil cooler 100 and closer to engine core 26 than lubricant channel 104 can provide a low-pressure drop path for lubricant during cold operation and serve as a heat source for de-congealing lubricant in the lubricant side air-oil cooler 100. Embodiments including apportioning device 120, e.g. a pressure relief valve or orifice, allow a portion of lubricant to flow through bypass channel 106. Embodiments including a pressure relief valve can divert a portion of lubricant from the lubricant inlet to the bypass channel from when pressure drop between lubricant inlet 108 and lubricant outlet 110 exceeds a predetermined limit.

Embodiments of gas turbine engine 10 having air-oil cooler 100 disposed within first compartment 38 can include a drip shield for diverting lubricant away from engine core 26 if a lubricant leak may be present. This allows for positioning air-oil cooler within compartments including working fluid bleed channels, such as a 2.5 bleed compartment for example. It is contemplated that the drip shield be configured for leaking oil about the circumference of engine core 26 and to the bottom of the 2.5 bleed compartment. It is further contemplated that the shield be configured for providing a line of sight barrier between air-oil cooler 100 for preventing impingement damage in the event that debris is ejected from the bleed port. This can prevent FOD, such as hail, birds, rocks and other foreign matter ingested by gas turbine engine 10 through the low-pressure compressor that could otherwise cause impingement damage to the interior surface of air-oil cooler 100. It is also contemplated that hail fins can be included forward of air-oil cooler 100 and that air diverter 200 include a command close function, further hardening air-oil cooler 100 for FOD protection of the air-side fins 118 of air-oil cooler 100.

Embodiments of gas turbine engines described herein that include an arcuate air-oil cooler and a modulating air diverter with small radial thickness, enabling installation in confined engine compartments, such as the 2.5 bleed compartment (e.g. the inner fixed structure) of gas turbine engines. They can also provide packaging flexibility, high heat rejection capability and heat regulation capability of a compact core air-oil cooler. They can also provide improved engine performance as modulating air diverter can restrict air input to the air-oil cooler to that required to maintain lubricant within temperature limits.

The methods and systems of the present disclosure, as described above and shown in the drawings, provide for lubrication cooling systems with superior properties including more compact engine architectures, increased heat rejection capability, and reduced losses from aerodynamic drag. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An air-oil cooler for a gas turbine engine, comprising:
   a lubricant channel extending between a lubricant inlet and a lubricant outlet;
   an air cooling structure bounding the lubricant channel, wherein the air cooling structure has an arcuate shape configured for circumferentially spanning at least a portion of a gas turbine engine core;
   a bypass channel radially inward of and extending in parallel with the lubricant channel;
   an apportioning device integral with air-oil cooler, the apportioning device providing separate flows of lubricant into the lubricant channel and the bypass channel; and
   an air diverter in selective fluid communication with an external environment to selectively provide airflow to the air-oil cooler, wherein the air diverter varies the airflow to the air-oil cooler based on an operational condition, wherein the operational condition is a lubricant temperature or a temperature of the external environment.

2. The cooler as recited in claim 1, wherein the air cooling structure has an annular shape configured to extend about a circumference of the gas turbine engine.

3. The cooler as recited in claim 1, wherein the air cooling structure is a first air cooling structure, and further including a second air cooling structure circumferentially adjacent the first air cooling structure.

4. The cooler as recited in claim 1, wherein the lubricant inlet and lubricant outlet are on opposite ends of the air cooling structure.

5. The cooler as recited in claim 1, wherein the lubricant inlet and lubricant outlet are on a single end of the air cooling structure.

6. The cooler as recited in claim 1, wherein the lubricant channel is a single-pass lubricant channel.

7. The cooler as recited in claim 1, wherein the lubricant channel is a dual-pass lubricant channel.

8. The cooler as recited in claim 1, wherein the air cooling structure defines a plurality of fins oriented obliquely with respect to the lubricant channel.

9. The cooler as recited in claim 8, further including a shroud spanning radially outer ends of the plurality of fins.

10. A lubrication system for a gas turbine engine, comprising:
    an air-oil cooler, comprising:
    a lubricant channel extending between a lubricant inlet and a lubricant outlet;
    an air cooling structure bounding the lubricant channel, wherein the air cooling structure has an arcuate shape configured for circumferentially spanning at least a portion of a gas turbine engine core;
    an air diverter in selective fluid communication with an external environment to selectively provide airflow to the air-oil cooler, wherein the air diverter varies the airflow to the air-oil cooler based on an operational condition, wherein the operational condition is a lubricant temperature or a temperature of the external environment; and
    a bypass channel radially inward of and extending in parallel with the lubricant channel, wherein the air-oil cooler is configured to apportion lubricant flow between the lubricant cooling channel and the bypass channel to maintain lubricant in the cooling channel above a congealing temperature and reduce lubricant pressure drop across the air-oil cooler.

11. The system as recited in claim 10, further including an orifice or pressure relief valve fluidly coupling the bypass channel and lubricant channel for apportioning lubricant between the channels.

12. The system as recited in claim 10, wherein the lubricant channel includes fins for transferring heat from lubricant traversing the lubricant channel.

13. The system as recited in claim 10, wherein the bypass channel is a decongeal channel configured for warming oil in the lubricant channel using heat from the gas turbine engine.

14. The system as recited in claim 10, wherein the air-oil cooler is a first air-oil cooler and further including a second air-oil cooler circumferentially adjacent to the first air-oil cooler.

15. A gas turbine engine, comprising:
    a lubricant circuit, including:
    a bearing compartment;
    a lubricant channel in fluid communication with the bearing compartment, wherein the lubricant channel extends between a lubricant inlet a lubricant outlet; and
    an air cooling structure bounding the lubricant channel, wherein the air cooling structure has an arcuate shape circumferentially spanning a gas turbine engine core; and
    an air diverter in fluid communication with the heat exchanger and configured for reducing drag associated with airflow across the air cooling structure, wherein the air diverter includes a nozzle flap operably connected to a synchronization ring for movement between a first position and a second position, wherein the nozzle flap is configured to provide a greater flow of air to the air-oil cooler in the first position than in the second position.

16. The engine as recited in claim 15, wherein the synchronization ring couples to an end of the nozzle flap and is configured for displacing the nozzle flap radially with respect to an engine axis of the engine by rotating about a core of the gas turbine engine.

17. The engine as recited in claim 15, further including a link coupling the synchronization ring to an aft end of the nozzle flap.

18. The engine as recited in claim 15, further including a link coupling the synchronization ring to a forward end of the nozzle flap.

19. The engine as recited in claim 15, wherein the synchronization ring spans the circumference of the engine core.

* * * * *

UNITED STATES PATENT AND TRADEMARK OFFICE
CERTIFICATE OF CORRECTION

PATENT NO. : 10,508,598 B2
APPLICATION NO. : 15/111997
DATED : December 17, 2019
INVENTOR(S) : Richard Alan Weiner Page 1 of 1

It is certified that error appears in the above-identified patent and that said Letters Patent is hereby corrected as shown below:

In the Specification

In Column 6, Line 14 please delete "120'"

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*